US012212919B2

(12) United States Patent
Koo

(10) Patent No.: US 12,212,919 B2
(45) Date of Patent: Jan. 28, 2025

(54) EAR-WORN HEARING DEVICE WITH MULTIPLE TRANSDUCERS

(71) Applicant: Knowles Electronics, LLC, Itasca, IL (US)

(72) Inventor: Luke Koo, Naperville, IL (US)

(73) Assignee: Knowles Electronics, LLC, Itasca, IL (US)

( * ) Notice: Subject to any disclaimer, the term of this patent is extended or adjusted under 35 U.S.C. 154(b) by 200 days.

(21) Appl. No.: 17/978,106

(22) Filed: Oct. 31, 2022

(65) Prior Publication Data

US 2024/0147137 A1 May 2, 2024

(51) Int. Cl.

*H04R 1/24* (2006.01)
*H04R 11/02* (2006.01)
*H04R 25/00* (2006.01)

(52) U.S. Cl.

CPC ............... *H04R 1/24* (2013.01); *H04R 11/02* (2013.01); *H04R 25/48* (2013.01); *H04R 25/604* (2013.01); *H04R 25/652* (2013.01); *H04R 2225/023* (2013.01)

(58) Field of Classification Search

CPC .......... H04R 1/24; H04R 11/02; H04R 25/48; H04R 25/604; H04R 25/652; H04R 2225/023; H04R 2225/025; H04R 1/26; H04R 25/02; H04R 1/1016; H04R 1/02
See application file for complete search history.

(56) References Cited

U.S. PATENT DOCUMENTS 10,516,935 B2 12/2019 Wiederholtz et al.
2014/0169583 A1* 6/2014 Huang ..................... H04R 1/24 381/74
2014/0205131 A1* 7/2014 Azmi .................. H04R 1/1066 381/380
2019/0020946 A1* 1/2019 Tu ........................ H04R 1/1016

FOREIGN PATENT DOCUMENTS

KR 101236082 B1 * 2/2013 ............... H04R 1/02

* cited by examiner

*Primary Examiner* — Angelica M McKinney
(74) *Attorney, Agent, or Firm* — Hickman Becker Bingham Ledesma LLP; Matthew C. Loppnow

(57) ABSTRACT

An ear-worn hearing device and acoustic transducer subassemblies therefor are disclosed. The hearing device includes a hearing device housing with a sound passage terminating at a sound port on a portion of the hearing device housing configured to protrude toward or into a user's ear canal. Multiple transducers are arranged end-to-end along a lengthwise dimension, wherein a first transducer is located between the other transducers and the sound port of the hearing device housing. The transducers each include a sound outlet acoustically coupled to the sound port via the sound passage.

18 Claims, 5 Drawing Sheets

100

EAR-WORN HEARING DEVICE WITH MULTIPLE TRANSDUCERS

FIELD OF THE DISCLOSURE

The present disclosure relates generally to ear-worn hearing devices and more particularly to ear-worn hearing devices comprising multiple acoustic transducers, as well as acoustic transducer assemblies configured for hearing devices with space constraints.

BACKGROUND

Some ear-worn hearing devices comprise an in-ear component that extends at least partially into the user's ear canal. One such hearing device is a receiver-in-canal (RIC) type behind-the-ear (BTE) hearing aid comprising a RIC unit configured for at least partial insertion into the user's ear canal. The RIC unit is connectable to a BTE unit that sits behind a user's ear (pinna) and transmits electrical audio signals to the RIC unit. The RIC unit generally comprises an acoustic transducer in the form of a balanced armature receiver (also referred to herein as a "receiver") integrated with an electrical cable assembly comprising a connector that plugs into the BTE unit. The BTE unit contains one or more microphones, batteries, and electrical circuits for converting sensed environmental sounds into amplified electrical audio signals transmitted to the receiver in the RIC unit. The electrical circuit can also perform noise suppression and sound localization, among other audio signal processing functions. RIC units and other ear-worn hearing devices produce sound in a relatively narrow frequency range, often at higher frequencies of the audio spectrum, due in part to the characteristic frequency response of the receiver. Space constraints in the hearing device can also limit the number of acoustic transducers that can be integrated with the hearing device. Such space constraints can result from the need to locate the hearing device at least partially in the user's ear canal and from the trend to provide increased functionality in increasingly small hearing devices. Thus, there is an ongoing need for improvements in ear-worn hearing devices.

BRIEF DESCRIPTION OF THE DRAWINGS

The objects, features and advantages of the present disclosure will become more fully apparent from the following detailed description and the appended claims considered in conjunction with the accompanying drawings. The drawings depict only representative embodiments and are therefore not considered to limit the scope of the disclosure.

Those of ordinary skill in the art will appreciate that the figures are illustrated for simplicity and clarity and therefore may not be drawn to scale and may not include well-known features, that the order of occurrence of actions or steps may be different than the order described or that some or all of the actions or steps may be performed concurrently unless specified otherwise, and that the terms and expressions used herein have meanings understood by those of ordinary skill in the art except where different meanings are attributed to them herein.

DETAILED DESCRIPTION

The disclosure relates generally to ear-worn hearing devices and more particularly to ear-worn hearing devices comprising multiple acoustic transducers, as wells as to acoustic transducer assemblies configured for hearing devices with space constraints. Representative ear-worn hearing devices include, but are not limited to, Receiver-in-Canal (RIC), In-the-Ear (ITE), In-the Canal (ITC), Completely-in-the Canal (CIC), and Speaker-in-Concha (SIC) devices, among others. In the present specification, "ear-worn hearing device" means a hearing device (also referred to herein as a "unit") that is worn in the ear canal, partially in the ear canal, or on the ear facing the ear canal.

The ear-worn hearing device generally comprises a hearing device housing including a sound passage terminating at a sound port located to face the user's ear canal during use. The hearing device housing can be a substantially enclosed housing that fully contains multiple acoustic transducers. A substantially enclosed hearing device housing includes a sound port and possibly microphone ports and vents. Alternatively, the housing can enclose fewer than all transducers. For example, the housing can be a housing portion that caps as little as an end portion of one of the acoustic transducers, wherein the remaining acoustic transducers extend outside of the hearing device housing.

Figure 1:
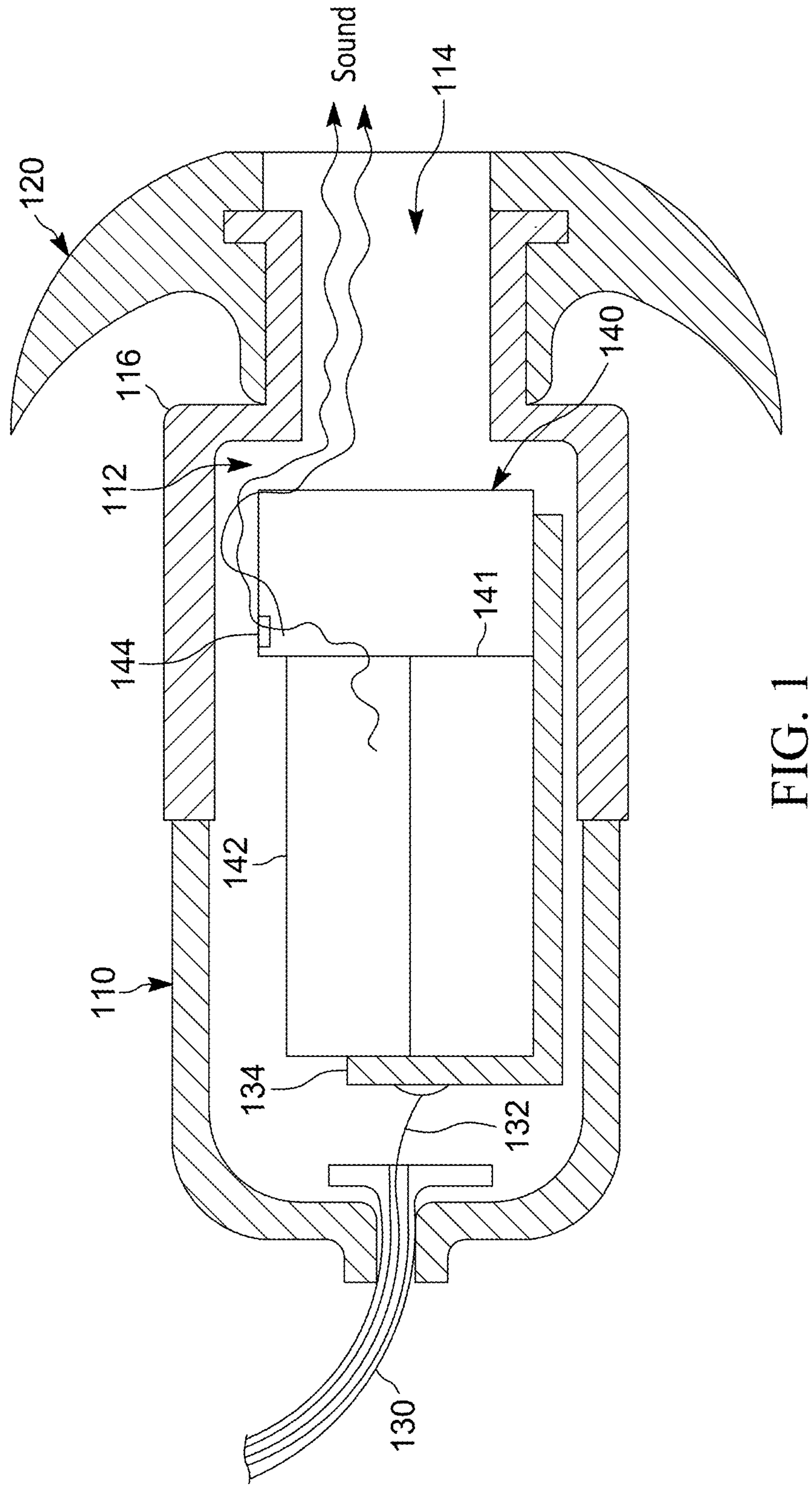
FIG. 1 is a representative ear-worn hearing device including a cable assembly.

In FIG. 1, the hearing device 100 is configured as a RIC unit comprising a RIC housing 110 defining a sound passage 112 terminating at a sound port 114 on an end portion 116 of the RIC housing. The housing end portion 116 is configured to support a removable ear-dome 120 and to protrude toward a user's ear canal during use. The ear-dome can be formed of a silicone or other pliable biocompatible material that is at least partially insertable into the user's ear canal. In ITE, ITC and other ear-worn hearing devices however the hearing device housing is configured for wear without an ear-dome. These and other ear-worn hearing devices may include a housing sized or custom-molded to fit the unique anatomy of the user's ear.

In FIG. 1, the RIC unit comprises a substantially enclosed RIC housing 110. In other implementations, RIC housing can have an open end opposite the end portion 116, wherein a portion of one or more acoustic receivers are exposed. Other ear-worn hearing devices also comprise a substantially enclosed hearing device housing. Representative ear-worn hearing devices comprising a substantially enclosed hearing device housing include, but are not limited to, ITE, ITC, CIC and SIC units, among others.

In FIG. 1, a cable assembly 130 is mechanically coupled to the RIC housing 110. The cable assembly is also mechanically connected or connectable to a BTE unit (not shown) configured for wear on or behind the user's ear. More generally, the cable assembly connects the RIC unit to a base unit that can be worn on some other part of the user's body. The base unit typically comprises one or more batteries, electrical circuits (e.g., an audio signal processor, audio amplifier, etc.), and one or more microphones. The base unit can also comprise a physiological sensor and a wireless transceiver among other components. The cable assembly comprises electrical conductors 132 electrically connecting the acoustic transducers of the RIC unit to the electrical circuit of the base unit as described further herein.

Figure 2:
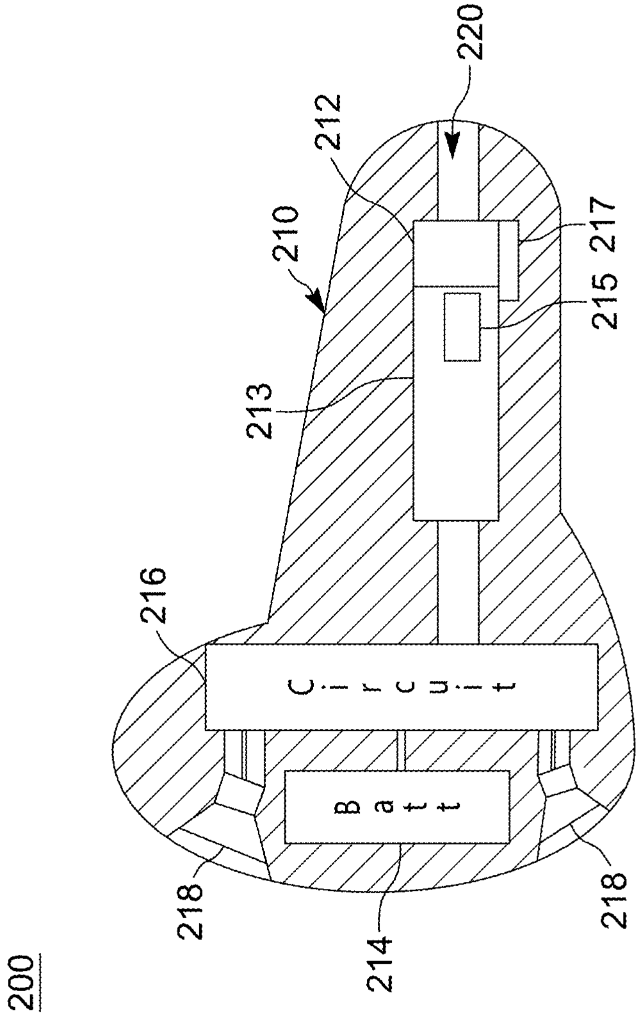
FIG. 2 is another representative ear-worn hearing device.

Other ear-worn hearing devices are stand-alone devices devoid of a cable assembly and a base unit. In FIG. 2, a standalone hearing device 200 comprises a hearing device housing 210 resembling an ITC unit. Alternatively, the hearing device housing can be configured as an ITE, CIC and SIC unit, among others. In these and other ear-worn units, multiple transducers 212, 213, batteries 214, electrical circuits 216, microphones 218 and other components are contained within the hearing device housing. The stand-alone ear-worn unit can also comprise a physiological sensor and a wireless transceiver among other components.

Generally, the ear-worn hearing device comprises two or more (multiple) acoustic transducers assembled with the hearing device housing individually or as a transducer subassembly. The transducer generally comprises a transducer housing having an electrical terminal and a sound outlet. The multiple transducers are arranged end-to-end along a common lengthwise dimension. The lengthwise configuration permits integration of the multiple acoustic transducer assembly in hearing devices with space constraints dictated by the ear canal and other considerations, wherein such space constraints may not accommodate a side-by-side arrangement of the transducers.

The one or more acoustic transducers can have a cube, or rectangular cuboid, or cylindrical shape, among others, attributed to the transducer housing. Multiple acoustic transducers within a particular ear-worn unit can have the same shape or different shapes. Some transducers comprise a longitudinal dimension between opposite ends. The longitudinal dimension of a rectangular cuboid is between opposite ends separated by the longest dimension of the hearing device housing. The longitudinal dimension of a cylindrical transducer is along its axis of symmetry. Alignment of the longest dimension of the transducers along the common lengthwise dimension of the end-to-end arrangement can minimize the cross-sectional area occupied by the transducers. In other implementations, it is unnecessary to align the longest dimension of the transducers along the lengthwise dimension of the end-to-end arrangement of acoustic transducers.

In some implementations, the multiple acoustic transducers are arranged and mechanically coupled as a subassembly prior to assembly with the hearing device housing of the ear-worn hearing device. The coupling can be direct or indirect. Direct coupling can be achieved by a weld, adhesive, or by fabricating more than one acoustic transducer in a common transducer housing, wherein the first and second transducer housings constitute the common housing. An indirect coupling can be achieved with intermediate structure interconnecting the transducers. In other implementations, the first and second transducers are not coupled prior to assembly with the housing of the ear-worn hearing device. In the latter case, the multiple transducers are arranged end-to-end when assembled with the hearing device housing. In either case, the hearing device housing can be structured with receptacles to accommodate individual transducers, or a subassembly of multiple transducers, arranged in an end-to-end configuration.

Figure 3:
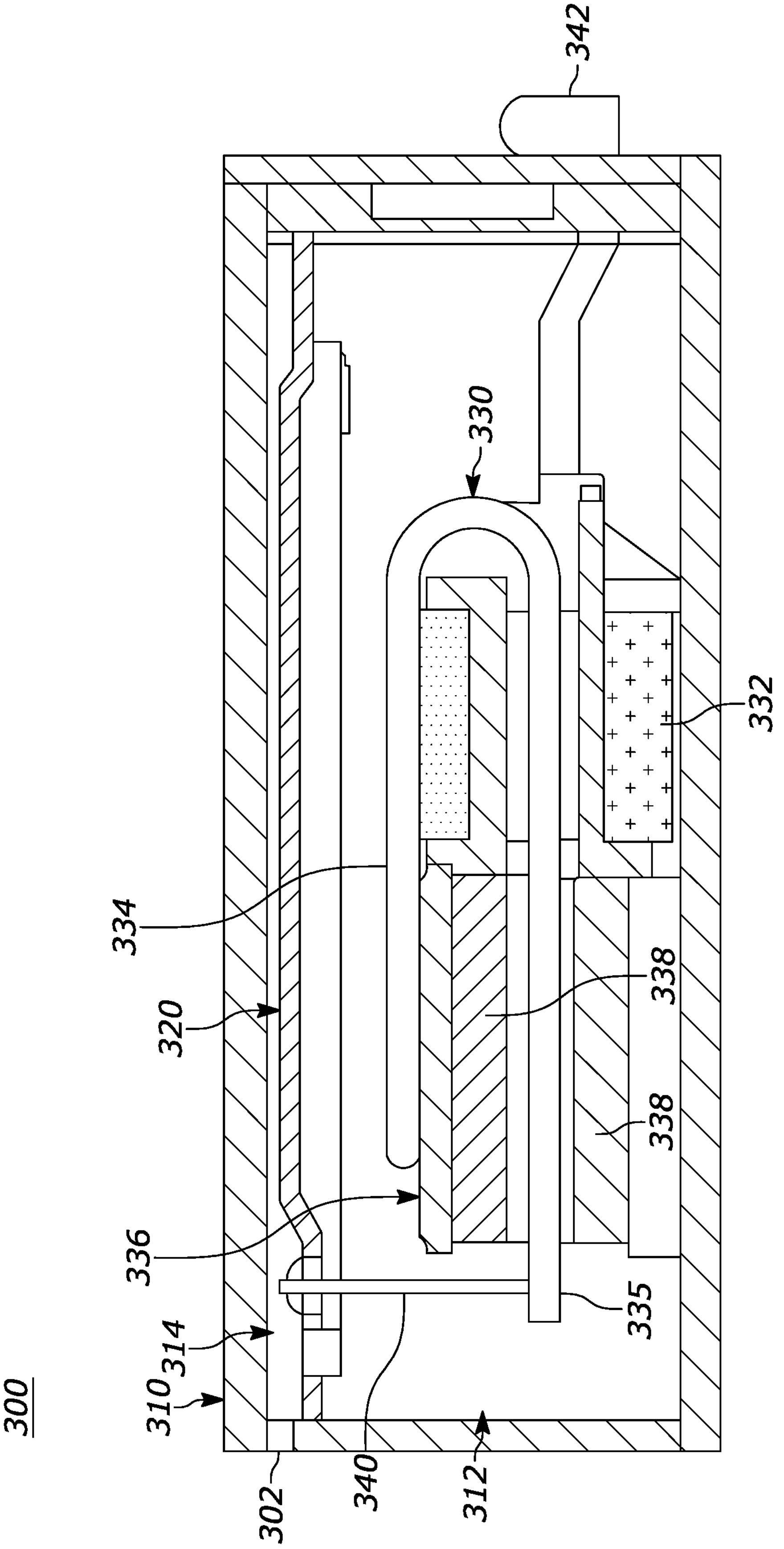
(Prior Art) FIG. 3
FIG. 3 is a sectional view of a prior art balanced armature receiver.

In one implementation, the multiple acoustic transducers are balanced armature receivers. Such receivers are also known in the art as moving iron speakers or receivers. In FIG. 3, a representative balanced armature receiver 300 comprises a transducer housing 310 having an interior separated by a diaphragm 320 into a back volume 312 and a front volume 314 coupled to a sound port 302. A motor 330 located in the back volume comprises a coil 332 electromagnetically coupled to an armature 334 having one end fixed to a yoke 336 and a free end 335 balanced between magnets 338 retained by the yoke. The armature is coupled to a movable portion of the diaphragm by a drive rod or other link 340. A magnetic field induced by an electrical audio signal applied to terminal contacts 342 connected to the coil moves the armature and diaphragm. Deflection of the diaphragm emits sound from the sound port 302. In FIG. 3, the armature has a U-shape, but other armatures can have an E-shape or M-shape, among others. Other balanced armature receivers can have different architectures than the representative receiver of FIG. 3. Other acoustic transducers like dynamic speakers can also be arranged in an end-to-end configuration as described herein. One or more dynamic speakers can also be arranged end-to-end with one or more receivers.

Figure 4:
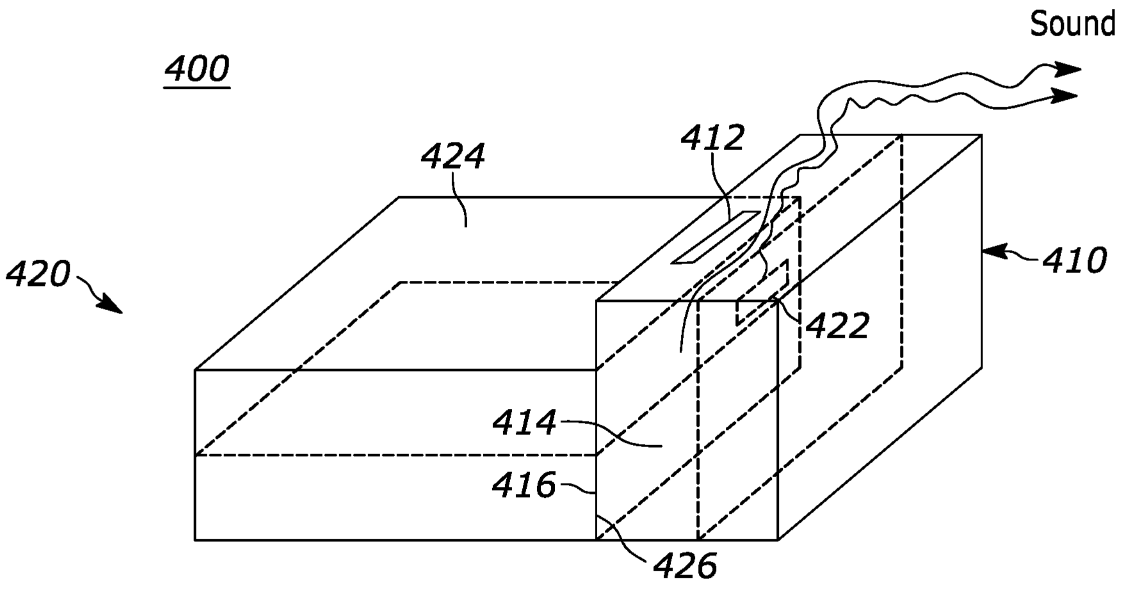
FIG. 4 is a schematic diagram of a representative transducer subassembly.

In the acoustic transducer subassembly 400 of FIG. 4, a first acoustic transducer comprises a first transducer housing 410 including a first sound outlet 412 coupled to a first front volume 414 of the first transducer housing. The first front volume is partially defined by an end 416 of the first transducer housing. The first sound outlet 412 is located on a transducer housing sidewall that partially defines the first front volume. A second acoustic transducer comprises a second transducer housing 420 including a second sound outlet 422 coupled to a second front volume 424 of the second transducer housing. The second sound outlet is located on an end 426 of the second transducer housing. The end 416 of the first transducer housing 410 is coupled to the end 426 of the second transducer housing, wherein the second sound outlet 422 is acoustically ported into the first front volume 414 and out the first sound outlet 412. Thus configured, sounds from both the first and second transducers are emitted from the first sound outlet 412 of the first acoustic transducer. Mechanically coupling the first and second acoustic transducers prior to assembly with the hearing device housing can ensure proper alignment and sealing between the first and second front volumes. Such a coupling can be direct or indirect as described herein.

Figure 5:
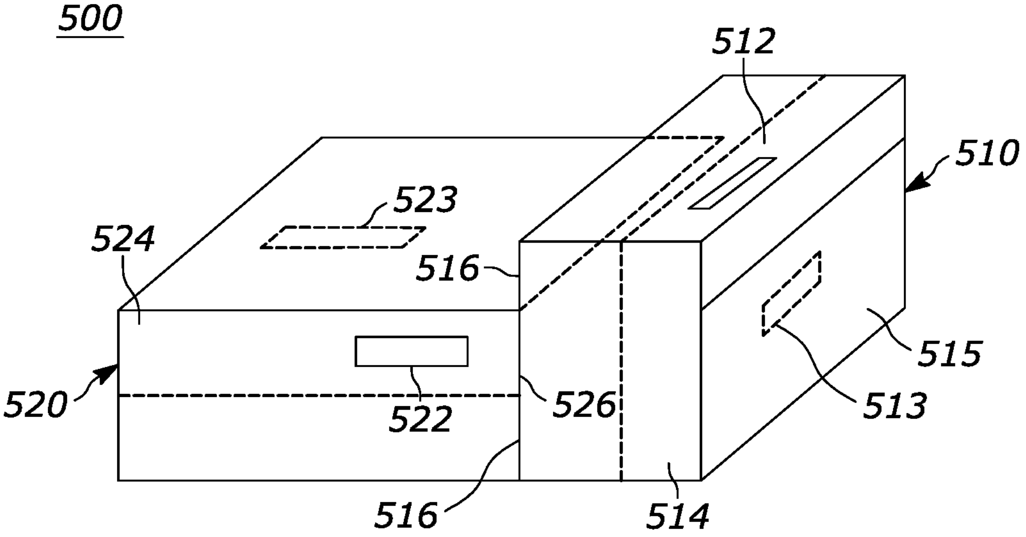
FIG. 5 is a schematic diagram of another representative transducer subassembly.

In the acoustic transducer subassembly 500 of FIG. 5, a first acoustic transducer comprises a first transducer housing 510 including a first sound outlet 512 coupled to a first front volume 514 of the first transducer housing. The first sound outlet 512 is located on a housing sidewall that partially defines the first front volume. Alternatively, the first sound outlet 513 can be located on an end 515 of the first transducer housing. A second acoustic transducer comprises a second transducer housing 520 including a second sound outlet 522 coupled to a second front volume 524 of the second transducer housing. The second sound outlet is located on a transducer housing sidewall that partially defines the second front volume. An end 516 of the first transducer housing 510 is adjacent to an end 526 of the second transducer housing. Thus configured, sounds from both the first and second transducers can be emitted into a sound passage of an ear-worn hearing device as shown in FIGS. 1 and 2. In FIG. 5, sound emitted from sound port 512 and sound port 522 or 523 travels to the sound passage via space in the hearing device housing. Sound emitted from sound port 513 travels more directly to the sound passage. Alternatively, sound emitted from the second transducer 520 can be ported to the first front volume 514 via a conduit (not shown) from the second sound output, whereby sound from both the first and second transducers are emitted from the first sound outlet 512. Mechanically coupling the first and second acoustic transducers can ease integration of the transducer subassembly with the hearing device housing.

Figure 6:
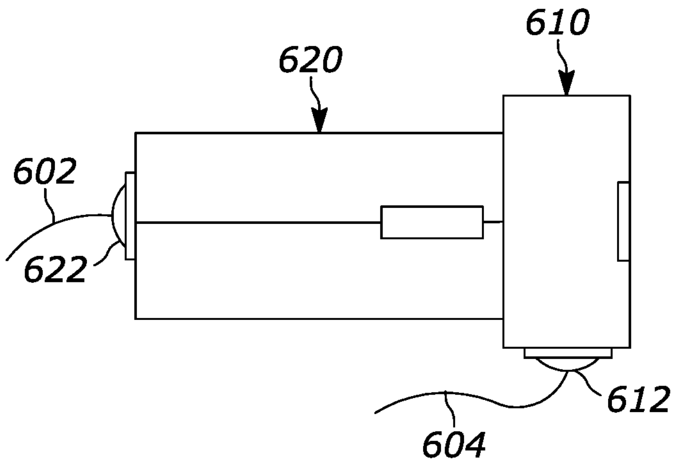
FIG. 6 is a schematic diagram of representative transducer subassembly connected to conductors.

In some implementations, each of the multiple acoustic transducers of the acoustic transducer subassembly are electrically connected to one or more conductors connected or connectable to electrical circuits of the ear-worn hearing device. In FIG. 6, first and second transducers 610 and 620 of an acoustic transducer subassembly are connected or connectable to an electrical circuit (not shown in FIG. 6) of the ear-worn hearing device by corresponding conductive wires 602 and 604 connected to terminal contacts 612 and 622 of the corresponding acoustic transducers. More generally, multiple wires can be connected to corresponding terminal contacts of each acoustic transducer. Also, in some implementations, the multiple acoustic transducers can be connected in parallel by the conductors. The conductive wires can be connected to conductors of a cable assembly or to an electrical circuit co-located in the hearing device housing with the acoustic transducers.

Figure 7:
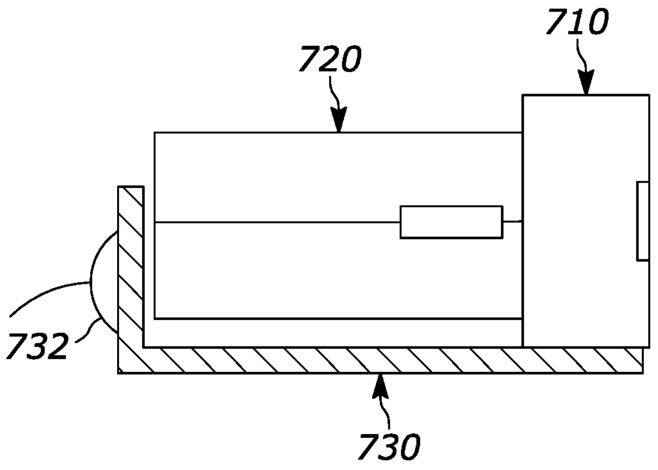
FIG. 7 is a schematic diagram of representative transducer subassembly connected to a flex circuit.

In FIG. 7, first and second transducers 710 and 720 of an acoustic transducer subassembly are connected or connectable to an electrical circuit (not shown in FIG. 7) of the ear-worn hearing device by one or more conductors of a flex circuit 730. The flex circuit can be connected (e.g., by soldering) to corresponding terminal contacts of the acoustic transducers. The flex circuit can also comprise one or more contacts 732 connectable to corresponding conductors of a cable assembly of a RIC unit. In FIG. 1, one or more conductors 132 of the cable assembly are electrically connected to corresponding conductors of a flex circuit 134. In some ear-worn hearing devices, components (e.g., integrated circuits . . . ) of an electrical circuit can be connected directly to the flex circuit. More generally, multiple wires can be connected to corresponding terminal contacts of each acoustic transducer. In some implementations, the flex circuit can also connect the multiple acoustic transducers in parallel.

In one implementation, an ear-worn hearing device comprises a housing including a sound passage terminating at a sound port on a portion of the housing configured to protrude toward a user's ear canal. A first acoustic transducer is coupled to the hearing device housing and comprises a first transducer housing having a first sound outlet acoustically coupled to the sound port via the sound passage. A second acoustic transducer comprises a second transducer housing including a second sound outlet acoustically coupled to the sound port via the sound passage. Representative hearing devices are shown schematically in FIGS. 1 and 2.

The first acoustic transducer is arranged end-to-end with the second acoustic transducer, wherein the first acoustic transducer is located between the second acoustic transducer and the sound port of the hearing device housing. In FIG. 1, the first transducer is located between the second transducer 142 and the sound port 114 of the hearing device. In FIG. 2, similarly, a first transducer 212 is located between the second transducer 213 and a sound port 220 of the ear-worn unit 200.

In some implementations, the first acoustic transducer comprises a first audio band frequency response, and the second acoustic transducer comprises a second audio band frequency response, wherein predominant frequencies of the first audio band frequency response are higher than predominant frequencies of the second audio band frequency response. In FIG. 1, for example, the first transducer 140 can have a higher frequency response than the second transducer 142. Locating the transducer with the highest frequency response nearest the sound port of the hearing device and locating the transducer with the lowest frequency response farthest from the sound port may provide an optimal acoustic output. But the arrangement of the higher and lower frequency transducers relative to the sound port may be different on other implementations.

In FIG. 1, the first sound outlet 144 of the first transducer 140 is coupled to the sound port 114 via space in the hearing device housing 110 and the sound passage 112. The second sound outlet (not shown) is located on an end 141 of the second transducer 142 facing the first transducer, wherein the second sound outlet is acoustically coupled to the front volume of the first transducer 140, as shown in FIG. 4 and described herein. Thus configured, the second sound outlet of the second transducer 142 is acoustically coupled to the sound port 114 via the first front volume of the first transducer. In FIG. 2, the first sound outlet (not shown) is located on an end of the first transducer 212 proximate the sound port and is directly coupled to the sound port 220 via the sound passage 112. In FIG. 5, such a sound outlet is shown at 513 and described hereinabove. In FIG. 2, the second sound outlet 215 of the second transducer 213 is acoustically coupled to transducer 140 sound port 220 via space 217 in the hearing device housing 210 and the sound passage.

While the disclosure and what is presently considered to be the best mode thereof has been described in a manner establishing possession and enabling those of ordinary skill in the art to make and use the same, it will be understood and appreciated that there are many equivalents to the representative embodiments described herein and that myriad modifications and variations may be made thereto without departing from the scope and spirit of the invention, which is to be limited not by the embodiments described but by the appended claims and their equivalents.

What is claimed is:

1. An ear-worn hearing device comprising:

a hearing device housing comprising a sound passage terminating at a sound port on a portion of the hearing device housing configured to protrude toward a user's ear canal;

a first acoustic transducer comprising a first terminal contact on a first transducer housing having a first front volume with a first sound outlet acoustically coupled to the sound port via the sound passage, the first acoustic transducer comprising a first diaphragm between the first front volume and a first back volume of the first acoustic transducer; and a second acoustic transducer comprising a second terminal contact on a second transducer housing having a second front volume with a second sound outlet acoustically coupled to the sound port via the sound passage, the second acoustic transducer comprising a second diaphragm between the second front volume and a second back volume of the second acoustic transducer, the first acoustic transducer arranged end-to-end with the second acoustic transducer, wherein the first acoustic transducer is located between the second acoustic transducer and the sound port of the hearing device housing, the second sound outlet acoustically ported into the first front volume of the first acoustic transducer, wherein the second sound outlet is acoustically coupled to the sound passage via the first front volume.

2. The ear-worn hearing device of claim 1, the first acoustic transducer comprising a first audio band frequency response, and the second acoustic transducer comprising a second audio band frequency response, wherein predominant frequencies of the first audio band frequency response are higher than predominant frequencies of the second audio band frequency response.

3. The ear-worn hearing device of claim 1, at least one of the first acoustic transducer or the second acoustic transducer having an elongated dimension between opposite ends of the corresponding acoustic transducer, wherein one of the opposite ends is adjacent to an end of the other acoustic transducer.

4. The ear-worn hearing device of claim 1,
the first sound outlet located on an end of the first transducer housing;
the second sound outlet located on an end of the second transducer housing coupled to the end of the first transducer housing.

5. The ear-worn hearing device of claim 4, the first sound outlet located on a side of the first transducer housing, the first sound outlet acoustically coupled to the sound passage via space in the hearing device housing.

6. The ear-worn hearing device of claim 4, wherein the first acoustic transducer is a first balanced armature receiver, and wherein the second acoustic transducer is a second balanced armature receiver.

7. The ear-worn hearing device of claim 6 further comprising a flex circuit electrically connected to a first contact of the first terminal and to a second contact of the second terminal.

8. The ear-worn hearing device of claim 1 further comprising a conductor electrically connected to the first terminal contact of the first acoustic transducer and to the second terminal contact of the second acoustic transducer.

9. The ear-worn hearing device of claim 1 is a Receiver-in-Canal (RIC) unit further comprising:
a cable assembly including a conductor electrically coupled to the first terminal contact of the first acoustic transducer and to the second terminal contact of the second acoustic transducer,
the hearing device housing comprising an ear-dome support structure through which the sound passage extends,
the first acoustic transducer is a first balanced armature receiver comprising a first audio band frequency response, and the second acoustic transducer is a second balanced armature receiver comprising a second audio band frequency response,
wherein predominant frequencies of the first audio band frequency response are higher than predominant frequencies of the second audio band frequency response.

10. The ear-worn hearing device of claim 9, the second acoustic transducer having an elongated dimension between opposite ends of the second acoustic transducer, wherein one of the opposite ends is adjacent to an end of the first acoustic transducer.

11. The ear-worn hearing device of claim 9,
the first sound outlet coupled to the first front volume of the first transducer housing, the first front volume partially defined by an end of the first transducer housing;
the second sound outlet coupled to the second front volume of the second transducer housing and located on an end of the second transducer housing coupled to an end of the first transducer housing,
the second sound outlet acoustically ported into the first front volume,
wherein the second sound outlet is acoustically coupled to the sound passage via the first front volume.

12. The ear-worn hearing device of claim 9,
the hearing device housing is a enclosed housing containing the first and second acoustic transducers,
the first sound outlet coupled to the first front volume of the first transducer housing and located on an end of the first transducer housing opposite an end of the first transducer housing coupled to an end of the second transducer housing, and
the second sound outlet coupled to the second front volume of the second transducer housing and located on a side of the second transducer housing,
wherein the second sound outlet is acoustically coupled to the sound passage via space in the hearing device housing.

13. The ear-worn hearing device of claim 9 further comprising a flex circuit electrically connected to the first and second terminal contacts, wherein the cable assembly is electrically coupled to the first and second terminal contacts by the flex circuit.

14. An ear-worn acoustic transducer subassembly comprising:
a first acoustic balanced armature transducer comprising a first transducer housing having a first electrical terminal and a first sound outlet on a first front volume, the first acoustic balanced armature transducer comprising a first diaphragm between the first front volume and a first back volume, the first transducer housing having opposite ends;
a second acoustic balanced armature transducer comprising a second transducer housing having a second electrical terminal and a second sound outlet on a second front volume, the second acoustic balanced armature transducer comprising a second diaphragm between the second front volume and a second back volume, the second transducer housing having a longitudinal dimension between opposite ends,
the first acoustic balanced armature transducer arranged end-to-end with, and mechanically coupled to, the second acoustic transducer, along the longitudinal dimension of the second acoustic transducer,
the first sound outlet located on an end of the first transducer, and the second sound outlet located on an end of the second transducer housing mechanically coupled to the end of the first transducer housing,
wherein the second sound outlet is acoustically ported into the first front volume of the first balanced armature acoustic transducer.

15. The transducer subassembly of claim 14 further comprising a flex circuit electrically connected to a first contact of the first electrical terminal and to a second contact of the second electrical terminal.

16. The transducer subassembly of claim 14, wherein at least one of the first or second transducer housing is a cylindrical housing.

17. The transducer subassembly of claim 14, wherein the second transducer housing is a rectangular cuboid.

18. The transducer subassembly of claim 17 further comprising a flex circuit electrically connected to a first contact of the first electrical terminal and to a second contact of the second electrical terminal.

* * * * *